United States Patent Office 3,518,203
Patented June 30, 1970

3,518,203
CORROSION AND SCALE INHIBITOR COMPOSITIONS AND PROCESSES THEREFOR
Emilio A. Savinelli, Convent, N.J., and James K. Rice, Pittsburgh, Pa., assignors to Drew Chemical Corporation, New York, N.Y., a corporation of Delaware
No Drawing. Filed June 28, 1966, Ser. No. 561,023
Int. Cl. C02b 1/18, 5/02
U.S. Cl. 252—181                                    13 Claims

ABSTRACT OF THE DISCLOSURE

This disclosure is directed to compositions and methods for inhibiting corrosion and the deposition of scale in cooling water systems. An example of a superior composition disclosed is a combination of a water soluble salt of zinc or cadmium, an amino tri(alkylphosphonic) acid and a leucocyanidin-catechin polymer.

---

This application relates to methods of inhibiting corrosion and the deposition of scale in cooling water systems, and to compositions for accomplishing the inhibition of corrosion and scale deposition in such systems. More particularly, this application relates to methods of inhibiting corrosion and scale deposition without using chromates or dichromates or inorganic condensed phosphates in the aqueous system.

There are two distinct but related problems associated with the use of water for cooling. First, the water tends to corrode the metals used in the heat exchange equipment and related fittings. These metals include copper, steel, aluminum and copper alloys. Secondly, dissolved and suspended solids or other colloidal matter in the water form deposits which cling to the metal surfaces, in the form of scale or deposits, thereby reducing the rate of heat transfer in the heat exchangers, clogging the conduits, and adding to the corrosive aspect of the water used for cooling. The latter aspect is explained by the fact that on a metal surface exposed to a corrosive environment, such as water containing dissolved oxygen and dissolved ionic inorganic solids, corrosion will localize under deposits of solids.

In the past, methods of inhibiting corrosion and scale deposition have often involved the use of chromates or dichromates dissolved in the cooling water, frequently in combination with inorganic condensed phosphates. The use of chromates or dichromates has the disadvantage that these inorganic ions are toxic and pollute any stream or river into which the cooling water is discharged after use. Such condensed phosphates often undergo chemical conversion to orthophosphates. The latter form leads to serious deposition of calcium and/or aluminum orthophosphate which aggravates the fouling problem and it diminishes the corrosion inhibiting characteristics of the treatment. Such orthophosphates stimulate the growth of algae, etc.

A superior composition has now been discovered for treating aqueous cooling water to inhibit corrosion and scale formation which does not require either polyphosphates or chromate or dichromate ions. This new composition comprises as the effective inhibiting ingredients a divalent metal ion selected from the class consisting of zinc, cadmium, and mixtures thereof; an amino tri(alkylphosphonic) acid or a salt thereof, and a leucocyanidin-catechin polymer" as hereinafter described. When copper or its alloys is used in portions of the cooling system, known specific copper corrosion inhibitors may advantageously be added.

The relative and total amounts of these ingredients and the total amount of the overall composition used in the cooling water are referred to hereinafter.

The divalent zinc or cadmium ions may be derived from any suitable water soluble salt, preferably their sulfates. The chlorides and fluorides of these two heavy metals should be avoided if the system contains aluminum. The concentration of the zinc or cadmium ions in the cooling water should be at least 2 parts per million by weight (unless otherwise stated, all quantitatively stated amounts are on a weight basis) and preferably not less than 5 p.p.m. Little operational advantage is derived from exceeding 50 p.p.m. of zinc.

The second constituent of the composition is one or more amino tri(alkylphosphonic) acids having the formula $[(OH)_2OP-R-]_3N$, or, alternatively, the formula $N(-R-H_2PO_3)_3$, wherein $-R-$ is a lower alkylene radical having from one to four carbon atoms, e.g., $-CH_2-$, $-C_2H_4-$, etc. These compounds are referred to in U.S. Pat. No. 3,234,124. Amino tri(methylphosphonic) acid is commercially available from the Monsanto Chemical Company under the trade name Dequest 2000. Salts derived from mono-valent cations (e.g., sodium, potassium and ammonium ions) of such acids may also be used. The sodium salt of amino tri(methyl-phosphonic) acid is sold as Dequest 2006.

The amino tri(alkylphosphonic) acid and zinc ions exhibit synergistic corrosion inhibitory characteristics when used in conjunction with each other. The acid also exhibits advantageous anti-fouling characteristics. It is used in the range of about 0.1 to about 25 p.p.m. in the cooling water.

The manufacture, chemical and physical properties, and structure of the leucocyanidin-catechin polymer is given in an article expressly incorporated herein by reference, by H. L. Hergert et al. entitled "Isolation and Properties of Dispersant From Western Hemlock Bark," Forest Products Journal, November 1965, pages 485–491, with particular reference to pages 488–89. As used herein, the phrase "leucocyanidin-catechin polymer" refers to materials of the character therein described. One such product is available from Rayonier Inc. under the trade name Rayflo C. This material is used in a concentration in a range from about 0.5 to about 100 p.p.m. in the cooling water.

When the cooling system is made of copper components, it is advantageous to include a specific copper corrosion inhibitor, such a dialkyldithiocarbamate, e.g., diethyldithiocarbamate, wherein the alkyl radicals have from one to four carbon atoms. Equivalent specific copper corrosion inhibitors include mercaptobenzothiazole or its sodium salt, and benzotriazole. Such copper corrosion inhibitors are used in an amount in the range of form about 0.1 to about 10 p.p.m.

If desired, sodium bisulfate optionally may be included in the compositions.

A suitable composition for inhibiting corrosion and scale formation in aqueous cooling systems comprises, as the effective corrosion inhibitors, about 5 parts of leucocyanadin-catechin polymer, in the range of about ½ to about 3 parts of amino tri(methylphosphonic) acid, and in the range of about from 1 to about 3 parts of zinc or cadmium ions and, when desired, in the range of about from 0.05 to about 0.5 part of a copper corrosion inhibitor such as diethyldithiourea. The total amount of such a composition when used in an aqueous cooling system ranges preferably from about 10 to about 300 p.p.m. It is to be understood that such ingredients may be added to the cooling water individually or as mixtures of two or more of them.

EXAMPLE 1

The relative inhibiting effectiveness was determined for a composition comprising equal weights of zinc sulfate monohydrate, amino tri(methylphosphonic) acid and a leucocyanidin-catechin polymer (Rayflow C) when added to a standardized "hard water." The latter contained 500 p.p.m. of chloride ions, 500 p.p.m. of sulfate ions, 0.2 p.p.m of copper, 0.5 p.p.m. of iron and, as calcium carbonate equivalents, 300 p.p.m. of calcium, 100 p.p.m. of magnesium, 20 p.p.m. of M.O. alkalinity, and 1646 p.p.m. of total dissolved solids.

The test unit used was a simple recirculating system in which water was circulated over flat metal discs, made of either steel or copper of approximately 1¼″ in diameter, mounted on a thermostatically controlled heating block which maintained specimen skin temperatures at 100° C. The influent water temperature was at 36° C.

Cleaned and polished specimens of known weight were subjected to the recirculating test water for a period of 20 hours at the temperature conditions indicated, then removed and weighed. Deposits were then removed and the specimens weighed again in order to determine the weight loss of metal and the weight of the scale deposited on the specimen during the run.

When using the standard "hard water" at a pH in the range of 8.0–8.4 and without any inhibitor composition, the control steel test specimen lost 31 milligrams of metallic weight and had deposited on it 98 milligrams of scale. When the inhibitory composition described in the first paragraph of this example was used at the levels of 40 to 80 p.p.m., the weight loss remained the same, at 31 and 30 milligrams, respectively, but the deposit on the specimen was reduced to 37 and 34 milligrams, respectively.

When copper was used as the specimen, the deposit on the control specimen was 34 milligrams. When the composition described in the first paragraph of this example was used at the levels of 40 and 80 p.p.m., the deposit was reduced to 0.3 and 0.9 milligram, respectively.

EXAMPLE 2

The example describes a series of experiments illustrating the relative effectiveness of the new corrosion inhibiting composition and also the synergistic effect obtained by using in combination the three primary ingredients of the new composition. Low carbon steel coupons (three inches by one-half inch by one-sixteenth inch) were used as test specimens. They were attached to a rotating disc immersed in a temperature controlled aerated standard "soft water" test solution. The calculated water velocity past the specimen surface was 1.5 feet per second. The water temperature was thermostatically controlled at 120° F., ±2° F. by a heating mantle surrounding the glass container holding the test water. The water capacity of the container was 3.5 gallons. The pH of the water was adjusted by bubbling carbon dioxide as needed through a sparger tube. The stock "soft water" contained 500 p.p.m. of sulfate ions, 500 p.p.m. chloride ions and, as equivalent calcium carbonate, 30 p.p.m. of calcium, 30 p.p.m. of magnesium and 9 p.p.m. of M.O. alkalinity.

(A) A test was conducted at a pH in the range of 6.6–7.0 in which the only inhibiting constituent was 500 p.p.m. of sodium chromate ($Na_2CrO_4$). The average (duplicate specimens) corrosion rate was determined to be 6.25 mils per year (m.p.y.).

(B) A second test was made using a corrosion inhibiting composition composed of 50 p.p.m. of zinc sulfate mono-hydrate and 50 p.p.m. of the leucocyanidin-catechin polymer in the standard soft water at a pH of 7.4–8.0. The average corrosion rate (quadruplicate specimens) was 18.1 m.p.y.

(C) A similar run was conducted concurrently in which the corrosion inhibitor was 50 p.p.m. of zinc sulfate monohydrate and 50 p.p.m. of amino tri(methylphosphonic) acid. The average corrosion rate was 26.1 m.p.y.

(D) An experiment similar to the foregoing was run using as the only inhibiting reagent 200 p.p.m. of amino tri(methylphosphonic) acid. The average corrosion rate was 71.7 m.p.y.

(E) A test using one embodiment of the invention was run on low carbon steel in which the corrosion inhibiting composition was composed of 60 p.p.m. of zinc sulfate mono-hydrate, 54 p.p.m. of the leucocyanidin-catechin polymer, and 20 p.p.m. of amino tri(methylphoshponic) acid. The average corrosion rate (triplicate specimens) was only 0.87 m.p.y.

(F) A control experiment was run using low carbon standard steel coupons which were exposed for 24 hours to the standard "soft water" stock solution at a pH 6.6–7.0. No corrosion inhibitor was used, and the average corrosion rate (duplicate specimens) was 101.9 m.p.y.

EXAMPLE 3

A run similar to the foregoing was made using a standardized "hard water" stock solution at 120° F. for a period of 24 hours. The pH of the solution during the first hour was 7.0 and was then raised to 7.5 for the remaining 23 hours. The corrosion inhibiting composition was composed of 35.0% zinc sulfate mono-hydrate, 42.9% of the leucocyanidin-cathechin polymer, 10.0% sodium bisulfate, 0.1% diethyldithiourea and 12.0% amino tri(methylphosphonic) acid used in a total concentration of 200 p.p.m. The average corrosion rate (quadruplicate specimens) was 0.59 m.p.y.

EXAMPLE 4

A longer test was conducted in the single tube heat exchanger apparatus described by E. A. Savinelli and O. Nowakowski in "Laboratory Corrosion Studies Using a Single Tube Heat Exchanger" presented at the 21st annual conference of the National Association of Corrosion Engineering on Mar. 17, 1965 at St. Louis, Mo., and published in Industrial Water Engineering, vol. 2, pp. 18–19, 24 (June 1965). The steel heating surfaces had skin temperatures of about 122° F. The water flow rate was about two feet per second past the metal surface, and the heat transfer rate was about 18.3 B.t.u. per hour per square foot per ° F. The water used was a standardized "soft water" stock solution similar to that used in Example 2 at a pH of 7.0. Low carbon steel specimens were used.

In a five-day run without the use of any corrosion inhibitor, the corrosion averaged 1,288 mils penetration, and the scale formed averaged 158.8 milligrams per square inch of metal surface.

The five-day run was repeated using 100 p.p.m. of an inhibitor composition composed of 35.0% zinc sulfate mono-hydrate; 8.5% amino tri(methylphosphonic) acid; 42.9% of the leucocyanidin-catechin polymer; 1.0% benzotriazole; 10.0% sodium bisulfate; 2.5% of a surfactant; and 0.1% of diethyldithiourea. The corrosion of the steel averaged only 0.025 mil penetration, and the scale formed averaged only 4.1 milligrams per square inch of metal surface.

Having thus described the above invention, what is claimed is:

1. A composition for inhibiting corrosion and scale deposition in cooling water, the effective inhibitng ingredients of which consisting essentially of a water-soluble metal salt containing a divalent metal ion selected from the class consisting of zinc, cadmium, and mixtures thereof; at least one amino tri(lower-alkyl phosphonic) acid; and a leucocyanidin-catechin polymer, wherein the ratio by weight based on said metal ion:acid:polymer is in the range of about 5–50:0.1–25–1–100.

2. The composition of claim 1 containing about 5 parts of said polymer, in the range of from about ½ to about 3 parts of said acid; and in the range of about 1 to about 3 parts of said divalent metal ion.

3. The composition of claim 2 containing in addition in the range of from about 0.05 to about 0.5 part of a copper corrosion inhibitor.

4. The composition of claim 3 wherein said copper corrosion inhibitor is diethyldithiocarbamate.

5. A composition for inhibiting corrosion and scale formation in cooling water, the effective inhibiting ingredients of which consisting essentially of in the range of from about 10% to about 50% zinc ions from water-soluble salts of zinc; in the range of from about 10% to about 60% of a leucocyanidin-catechin polymer; and in the range of from about 1% to about 25% of at least one amino tri(lower-alkyl phosphonic acid).

6. An aqueous solution for use as cooling water consisting essentially of in the range of from about 5 to about 50 p.p.m. of zinc ions from water-soluble salts of zinc; in the range of from about 0.1 to about 25 p.p.m. of amino tri(lower-alkyl phosphonic) acid; and in the range of from about 1 to about 100 p.p.m. of a leucocyanidin-catechin polymer.

7. A cooling water composition comprising in the range of from about 10 to about 300 p.p.m. of the compsition of claim 2.

8. A process for reducing the rate of corrosion and scale deposition of a metal surface in contact with cooling water, which comprises contacting said metal surface with cooling water containing in the range of from about 5 to 50 p.p.m. zinc ions from water-soluble salts of zinc; in the range of from about 0.1 to about 25 p.p.m. of at least one amino tri(lower-alkyl phosphonic) acid; and in the range of from about 1 to about 100 p.p.m of a leucocyanidin-catechin polymer.

9. The aqueous solution of claim 6 consisting essentially of said zinc ions, said acid, said polymer and in the range of from about 0.1 to about 10 p.p.m. of a copper corrosion inhibitor.

10. The process of claim 8 wherein said metal surface contains copper and said cooling water contains in the range of from about 0.1 to about 10 p.p.m. of a compound having a specific activity for the inhibition of copper corrosion.

11. A process for reducing the rate of corrosion and scale deposition from cooling water with which comprises treating said water treating a water-soluble metal salt containing a divalent metal ion selected from the class consisting of zinc, cadmium, and mixtures thereof, at least one amino tri(lower-alkyl phosphonic) acid, and a leucocyanidin-catechin polymer, wherein the ratio of said metal ion:acid:polymer is in the range of about 5–50:0.1–25:1–100.

12. The process of claim 11 which comprises adding from 10 to 300 p.p.m. of said metal ion, acid and polymer to said water.

13. The process of claim 12 wherein the ratio of metal ion:acid:polymer is in the range of about 1–3:0.5–3:5.

References Cited

UNITED STATES PATENTS

| | | | |
|---|---|---|---|
| 2,238,651 | 4/1941 | Keenen. | |
| 2,941,953 | 6/1960 | Hatch | 21—2.5 |
| 3,234,124 | 2/1966 | Irani | 210—58 |
| 3,256,203 | 6/1966 | Robertson et al. | 252—181 |
| 3,336,221 | 8/1967 | Ralston | 210—58 |

LEON P. ROSDOL, Primary Examiner

W. E. SCHULZ, Assistant Examiner

U.S. Cl. X.R.

252—392; 21—2.7; 210—58

PO-1050
(5/69)

UNITED STATES PATENT OFFICE
CERTIFICATE OF CORRECTION

Patent No. 3,518,203      Dated June 30, 1970

Inventor(s) Emilio A. Savinelli and James K. Rice

It is certified that error appears in the above-identified patent and that said Letters Patent are hereby corrected as shown below:

In Column 1, line 67, "leucocyanidin-" should read -- "leucocyanidin- --. In Column 2, line 52, "form" should read -- from --.

In Column 4, line 61, "inhibitng" should read -- inhibiting --. In Column 6, line 6, delete "with" ; and in line 7, "treating" (second occurrence) should read -- with --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents